Patented Sept. 26, 1939

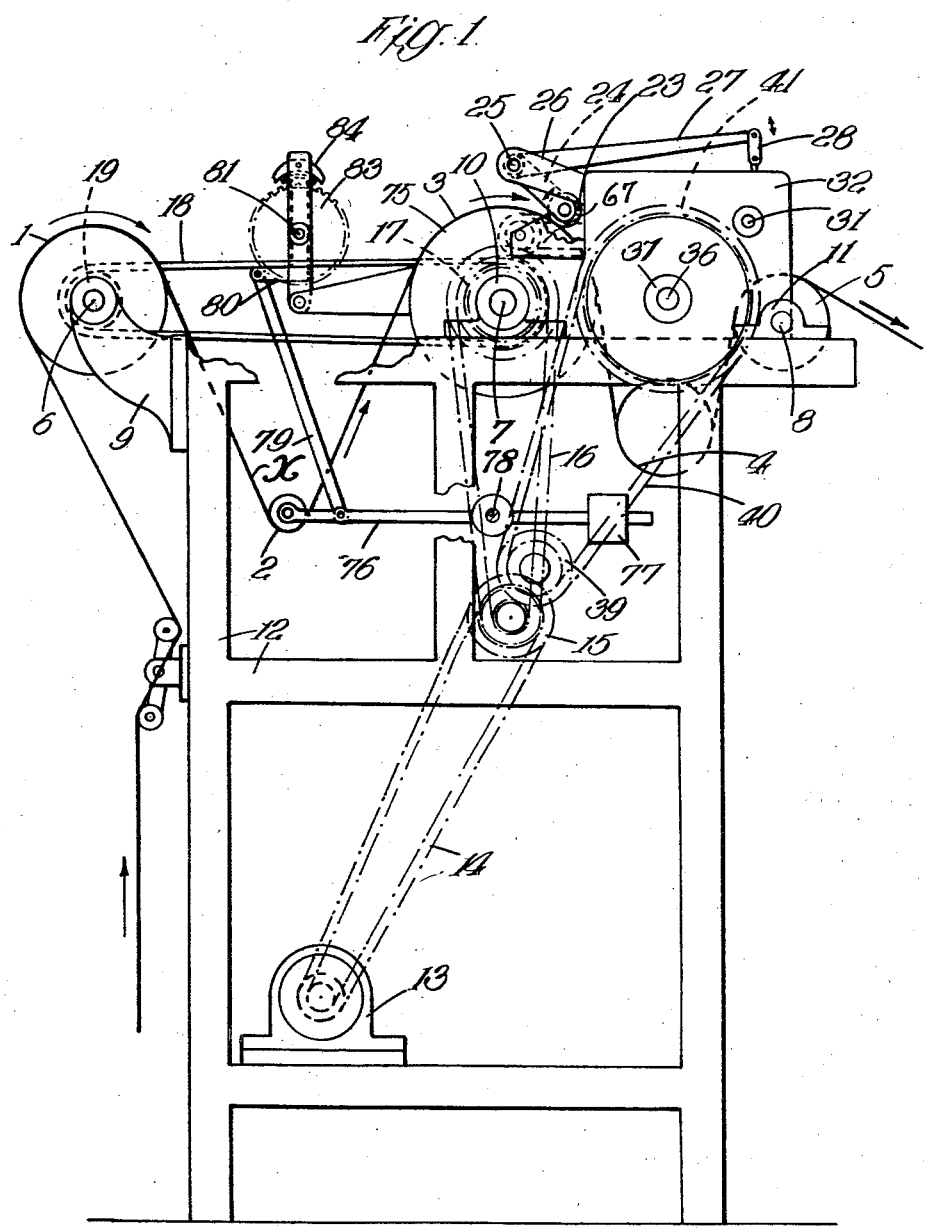

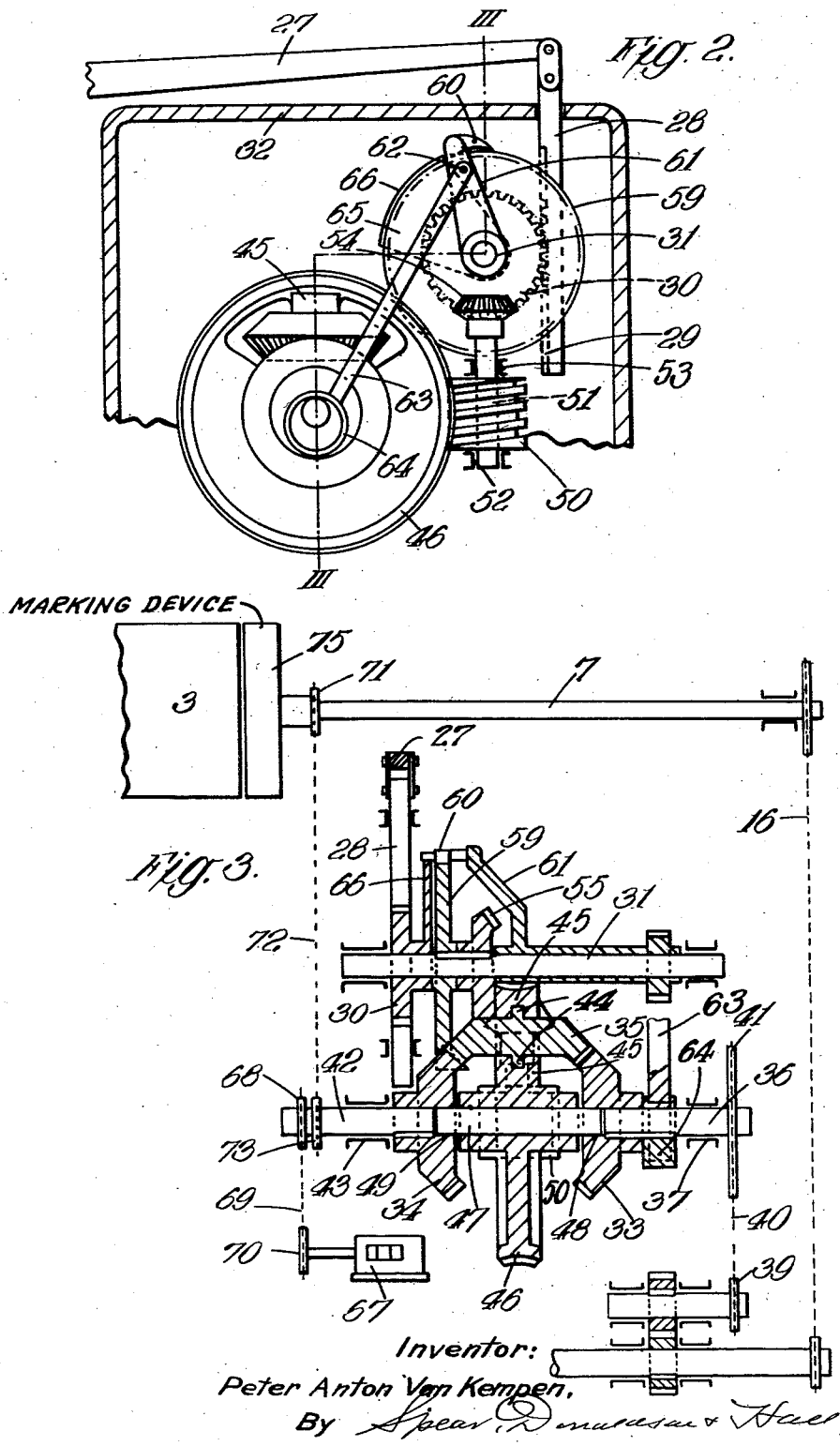

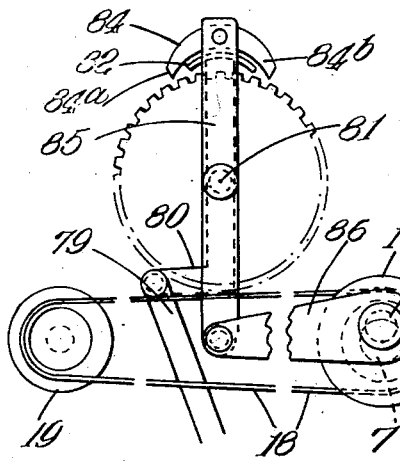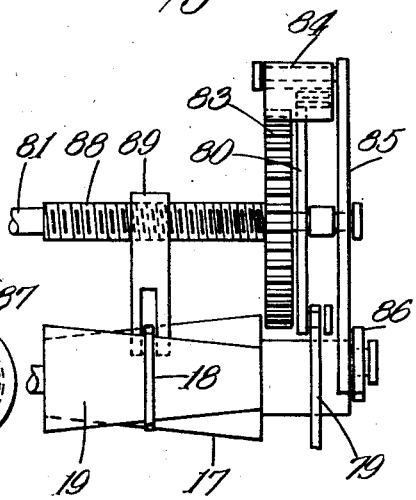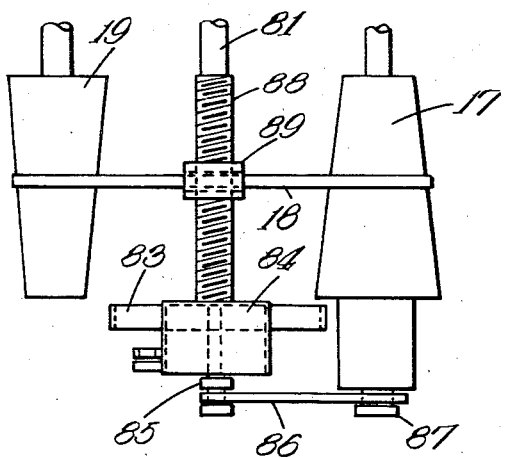

2,174,129

UNITED STATES PATENT OFFICE 2,174,129

APPARATUS FOR MEASURING AND MARKING WEB MATERIALS

Peter Anton van Kempen, Amtshauptmannschaft Zittau, Jonsdorf, Germany

Application May 21, 1937, Serial No. 144,105
In Great Britain May 28, 1936

12 Claims. (Cl. 33—129)

This invention relates to apparatus for measuring web materials.

When using a rotary measuring drum the linear measurements are influenced according to the thickness of the material being measured, the error of measurement increasing in proportion to the greater thickness of the materials. An object of this invention is to provide an apparatus which, while giving an accurate indication of the length of the material being measured by compensating for its thickness and therefore the increase in its peripheral measurement about the drum, is automatic in operation and of much simpler construction than existing machines for the same purpose.

A further object of the invention resides in the provision of means for accurately applying measurement marks to the material of the kind, for example, referred to in the specification of English Letters Patent No. 443,712.

A still further feature resides in the provision of means for infinitely varying within given limits the feed of the material to the measuring drum to maintain the tension of the material constant.

The invention contemplates other features and combinations of parts all of which are fuly disclosed in the following detailed description of a preferred embodiment of my invention, reference being made therein to the accompanying drawings.

In said drawings:

Figure 1 illustrates diagrammatically the measuring and marking machine in side elevation;

Figure 2 is a detail elevation of the differential compensating mechanism;

Figure 3 is a section on the line III—III of Figure 2, the connection of the differential to the drum, marking head and counter being shown diagrammatically;

Figure 4 is a detail elevation of the variable drive for the web material;

Figure 5 is an end elevation of Figure 4, and

Figure 6 is a plan view of Figure 4.

Referring now to the drawings and more particularly to Figure 1, the apparatus is shown as comprising a driving or feed roller 1, a tensioning roller 2, a measuring drum designated generally by the numeral 3, and preferably formed with a non-slip surface, a further tensioning roller 4, and a take-off roller 5, the material x to be measured passing about said rollers in the order mentioned. The respective shafts 6, 7, 8 of the feed roller, measuring drum and take-off roller are mounted for rotation in bearings 9, 10 and 11 respectively in side frame members 12 (only one being shown in the drawings). A motor 13 is mounted in the frame and drives the measuring drum as by means of chain and sprocket gear 14, 15, 16. The feed roller is driven from the drum shaft by a belt drive 17, 18, 19. The take-off roller 5 may, if desired, also be positively driven from the motor.

Means are provided to co-operate with the periphery of the web material being measured which, as shown, is arranged to pass about the upper part of the measuring drum 3, to additionally actuate a counting mechanism, and the marking device if such is embodied, in order to compensate for variations in length according to the thickness of the material. Such means consists of a feeler mechanism which is automatically adjustable according to the thickness of material and which is connected through a differential gear, to be later described, to the counting mechanism. The feeler mechanism comprises a roller 23 mounted at one end of an arm 24 pivoted at its other end on a shaft 25 supported in a bracket 26 extending from a convenient part of the machine frame. The roller 23 is so positioned and of such length as to rest on the edge of the web material and its pressure on the material may be controlled by a counterweight adjustable on an arm (not shown) extending from the arm 24 in a direction from its fulcrum 25 opposite to that of the roller. Moreover, the feeler roller 23 may, if desired, extend over the full width of the material, being similarly supported at the other side of the frame.

Integral with or otherwise connected to the arm 24 carrying the feeler roller 23 is an arm 27 one end of which is pivoted on the shaft 25 and the other end being connected to a depending link 28 (Figures 2 and 3). The link is shown as being guided for vertical movement and is formed on one face with teeth 29 meshing with the teeth of a pinion 30 loosely mounted on a shaft 31 carried in bearings in a casing 32 on the frame 12. The purpose of this rack and pinion mechanism is to control the operation of the aforementioned differential gear, which gear will now be described.

The differential gear comprises a pair of bevel sun wheels 33, 34 mounted for rotation about a common axis and an intermeshing planet wheel 35 to which movement may be imparted as will be later described to move said planet wheel in an annular path about said common axis for the purpose of increasing the speed of one of the sun wheels with respect to the other. The sun wheel 33 is secured for rotation with a shaft 36 mounted in a bearing 37 in the casing 32 and is positively driven from the motor by means of chain and sprocket gear 39, 40, 41. The other sun wheel 34 is mounted for rotation with a shaft 42 mounted in a bearing 43 in the casing 32 and co-axial with the shaft 36. The intermeshing planet wheel 35 is mounted for rotation with a pin 44, in bearings 45 formed in a worm wheel 46 which is mounted for rotation with a shaft 47 interposed between and co-axial with the sun wheel shafts 36, 42. As shown the ends of the shaft 47 are located within bores 48, 49 respectively of the sun wheels 33, 34, the shaft being free to rotate within said bores relative to the sun wheels.

The bearings 45 are arranged radially of the axis of the worm wheel 46 and are offset from said axis in such manner that rotation of the worm wheel, as will now be described, causes the planet wheel 35 to move in an annular path about said axis. The worm wheel 46 meshes with a worm 50 fixed on a shaft 51 supported for rotation in bearings 52, 53 in the casing 32. Also fixed on the shaft 51 is a bevel gear 54 which meshes with a second bevel gear 55 mounted for rotation with the shaft 31. A ratchet wheel 59 is also provided for rotation with the shaft 31, said ratchet being arranged to be driven by a pawl 60 carried at the end of an arm 61 loose on the shaft 31. To the arm 61 is pivotally connected as at 62 one end of a link 63 the other end of which is formed with an eccentric bush 64 embracing the shaft 36.

Also loose on the shaft 31 is a segmental shroud 65 the outer arcuate edge 66 of which is bent to lie over the teeth of the ratchet wheel 59. The shroud is connected for movement about the shaft 31 with the pinion 30, rotation of the pinion varying the position of the shroud about the toothed periphery of the wheel 59 with respect to the pawl. As has been previously mentioned the pinion 30 meshes with the teeth of the rack 28 which is in turn controlled by the setting of the feeler roller 23 in engagement with the surface of the material being measured. The angular position of the shroud is accordingly adjusted about the shaft 31 dependent upon the varying thicknesses of materials being measured and the effective movement of the continuously rocking pawl 60 is thereby controlled. For example the shroud may be adjusted so that two teeth of the ratchet wheel 59 within the angular displacement of the pawl are uncovered whereby, for each revolution of the shaft 36, the wheel 59 is rotated through a distance equal to two teeth upon clockwise movement, as seen in Figure 2, of the pawl 60. It will be clear that during the initial part of its clockwise movement the pawl will be held out of engagement with the ratchet wheel 59 by the shroud and rotates said wheel through a distance determined by the thickness of the material, equal to one, two, three or more teeth, during the latter part of its movement.

As previously mentioned the revolutions of the measuring drum are recorded by a counting mechanism which may be of any suitable kind. Preferably, however, it is provided with indicators showing the length of the measured materials. The counting mechanism is arranged for actuation under control of the differential gear so that variations in the length of the material passing over the drum, due to its thickness and therefore its excess peripheral measurement over that of the drum, will be recorded. The counting mechanism is shown generally in Figures 1 and 3, being designated by the reference 67 and is driven from the shaft 42 of the differential so that any additional movement of said shaft according to the setting of the feeler roller 23 is transmitted to the counting mechanism. The drive from the shaft 42 to the counter is by chain and sprocket gear 68, 69, 70.

It has been mentioned that measurement marks may be applied to the material being measured at unit intervals. When such marks are to be applied provision must be made for varying the positions at which the applying device is actuated according to the thickness of the material. For this purpose the output of the differential gear to the counting mechanism is also transmitted to the marking device as by means of chain and sprocket gear 71, 72, 73, which device may, for example, be of the internal, automatic kind disclosed in the specification of my aforesaid Letters Patent No. 443,712, so that said device is advanced as compared with the rotation of the measuring drum through a further distance corresponding to the output of the differential gear.

The marking device is indicated generally by the numeral 75 and including a marking head comprising an open-ended cylinder of the same diameter as the measuring drum and loosely mounted on the drum shaft. The marking head is arranged adjacent one end of the measuring drum, the material being measured overlapping the marking head to provide for application of the marks thereto. The marking head is normally rotated at the same speed as the measuring drum and the mark-applying device operated once or more for each revolution, according to the predetermined unit of length used. The output shaft 42 of the differential gear is coupled to the marking head as by chain and sprocket gear 71, 72, 73 and the head is therefore rotated for each revolution of the drum through a further distance corresponding to the rotary movement of said shaft 42 which, as has already been explained, is actuated under control of the feeler roller 23 and the adjustable shroud 65.

The feed roller 1 is illustrated in Figure 1 as being driven from the shaft 7 of the measuring drum by means of the belt and pulley drive 17, 18, 19. The pulleys 17 and 19 are, as shown in Figures 4, 5 and 6, oppositely coned to provide for automatic adjustment of the speed of the feed roller 1 compared with that of the drum 3, as will now be described. Such adjustment is necessary in view of the tendency of some kinds of materials to stretch or creep during their passage to the drum.

The tensioning roller 2, which is interposed between the feed roller 1 and the drum 3, is mounted for rotation at one end of an arm 76 provided at its other end with an adjustable counter-weight 77 and pivoted at 78 intermediate its length on the machine frame. The roller 2 rests in a depending loop of the web material. Connected to the arm 76 is one end of a link 79 the other end of which is connected to an arm 80. The arm 80 is pivoted for angular movement about a shaft 81 and is extended as shown in Figure 4 to support a shroud 82 disposed adjacent the teeth of a ratchet wheel 83 fast on the shaft 81. The ratchet wheel 83 is adapted to be rotated in either direction by a double-nosed pawl 84 pivotally mounted at one end of an arm 85 and radially adjacent the shroud 82 of the wheel. The arm 85 is loosely mounted intermediate its length on the shaft 81 and at its other end is connected to an arm 86 which is itself eccentrically connected as at 87 to the shaft 7 of the measuring drum. As the drum shaft is continuously rotated by the motor it will be clear that the double-nosed pawl 84 receives a continuous oscillatory movement about the toothed periphery of the ratchet wheel 83.

The shaft 81 is threaded at 88 and supports a belt fork 89 which is capable of axial movement along said threaded portion. The fork 89 engages the belt 18 and moves it axially of the pulleys 17, 19 according to the angular movement imparted to the shaft 81. Assuming now that the feed of the material to the measuring drum is excessive the depending loop of material supporting the roller 2 lengthens and the roller drops. The shroud 82 is thereupon rocked counter-clockwise as seen in Figure 4 into the path of the nose 84a of the pawl 84. Accordingly upon each clockwise movement of the arm 85 the nose 84b engages the ratchet wheel 83 and rotates it, together with the threaded shaft 88, until the position of the belt 18 with respect to the pulleys brings the speed of the shafts into synchronism. If the speed of the feed roller is too slow, the reverse operations take place, i. e., the loop shortens, the tensioning roller 2 is raised and moves the shroud 82 clockwise into the path of the nose 84b, while the nose 84a is enabled to rotate the ratchet wheel 83 counter-clockwise during each rocking movement of the arm 85 in that direction until the position of the belt synchronises the speeds of the feed roller and measuring drum according to the characteristics of the material being measured. The action of this speed synchronising device is exceedingly steady and avoids the snatch which is present with the more usual braking devices.

I claim:

1. In an apparatus for the measurement of web materials, a rotating drum of fixed diameter over which the material passes, a counting mechanism connected to record the number of revolutions of said drum, a differential gear having connection with said counting mechanism means co-operating with the peripheral surface of the material and having connections to control said differential gear and to additionally actuate the counting mechanism according to the thickness of the said material, said connections between said means and said differential gear including a worm wheel having radially disposed bearings therein to support the planet wheel of the differential, and a pawl and ratchet wheel, the effective movement of which is determined by the setting of said co-operating means, to impart movement to said worm wheel.

2. In an apparatus for the measurement of web materials, a rotating measuring drum over which the material passes, a differential, means connecting said drum to rotate one side of the differential, a register driven by the opposite side of said differential, a pawl mechanism, means oscillating said pawl mechanism in synchronism with the rotation of the drum, means connecting said mechanism to operate the center of said differential, and means operated by variations in the thickness of the material being measured to vary the oscillating stroke of said pawl mechanism effective upon said differential center.

3. Apparatus according to claim 2 including a worm wheel, the said differential gear including a planet wheel carried by said worm wheel, and gearing connecting said worm wheel to said pawl mechanism.

4. Apparatus according to claim 2 in which said differential gear comprises a sun wheel on a shaft driven in synchronism with said rotating drum, a second sun wheel on a shaft connected to drive the register, a planet wheel, a worm wheel supported on a third rotary shaft interposed between said first mentioned rotary shafts and gearing connections between said worm wheel and the said pawl mechanism, said planet wheel being mounted in said worm wheel.

5. Apparatus according to claim 2 in which said oscillating means comprises a rotary shaft driven in synchronism with the said rotary drum, an eccentric bushing on said shaft, and connecting means between said eccentric bushing and said pawl mechanism to cause said pawl mechanism to oscillate in accordance with the revolutions of said drum.

6. In apparatus of the class described, a rotating drum over which web material passes, means for feeding the material to the drum comprising a feed roller, and means for synchronizing the speed of the feed roller with the peripheral speed of the drum, said synchronizing means comprising ratchet and pawl mechanism means oscillating said pawl mechanism in synchronism with the rotation of the drum, a variable pulley drive from the drum to the web feeding roller, operative connections between said pawl mechanism and said drive, and means operated by variations in the length of material between said feed roller and drum to vary the stroke of the pawl mechanism effective upon said variable drive.

7. In apparatus for applying measurement marks to web materials, a rotating drum of fixed diameter over which the material passes, a differential, means connecting one side of said differential to rotate in synchronism with said drum, a rotating device driven by the opposite side of the differential for applying said marks to the material at predetermined unit intervals, means operated by variations in the thickness of the material being measured, and operative connections between said last-named means and the center of the differential whereby to additionally advance said device according to the thickness of the material.

8. In apparatus for the measurement of and the application of measurement marks to web materials, a rotating drum of fixed diameter over which the material passes, a differential, means connecting one side of said differential to rotate in synchronism with said drum, a rotating device driven by the opposite side of the differential for applying said marks to the material at predetermined unit intervals, a register also driven by the opposite side of the differential, means operated by variations in the thickness of the material being measured, and operative connections between said last-named means and the center of the differential whereby to additionally actuate the register and advance the mark applying device according to the thickness of the material.

9. Apparatus according to claim 8 wherein said operative connections include a worm wheel having radially disposed bearings therein to support the planet wheel of the differential center.

10. Apparatus according to claim 8 wherein said means operated by the variations in the thickness of the material being measured comprises a roller in engagement with the surface of the material on the drum, and said operative connections include a pawl and ratchet mechanism the effective movement of which is determined by the setting of said roller.

11. Apparatus according to claim 8 wherein said means operated by the variations in the thickness of the material being measured, comprises a roller in engagement with the surface of the material on the drum, and said operative connections include a pawl and ratchet wheel mechanism the effective movement of which is determined by the setting of said roller, and a worm wheel connected to be operated by said ratchet wheel, and having radially disposed bearings therein to support the planet wheel of the differential center.

12. Apparatus according to claim 8 wherein said means operated by the variations in the thickness of the material being measured comprises a roller in engagement with the surface of the material on the drum, and said operative connections include a pawl mechanism, means oscillating said pawl mechanism in synchronism with the rotation of the drum, said pawl mechanism being connected to operate a worm wheel having radially disposed bearings therein to support the planet wheel of the differential center.

PETER ANTON van KEMPEN.